March 4, 1941. A. GUTIERREZ 2,233,739
ANTIGLARE ATTACHMENT
Filed Feb. 3, 1939
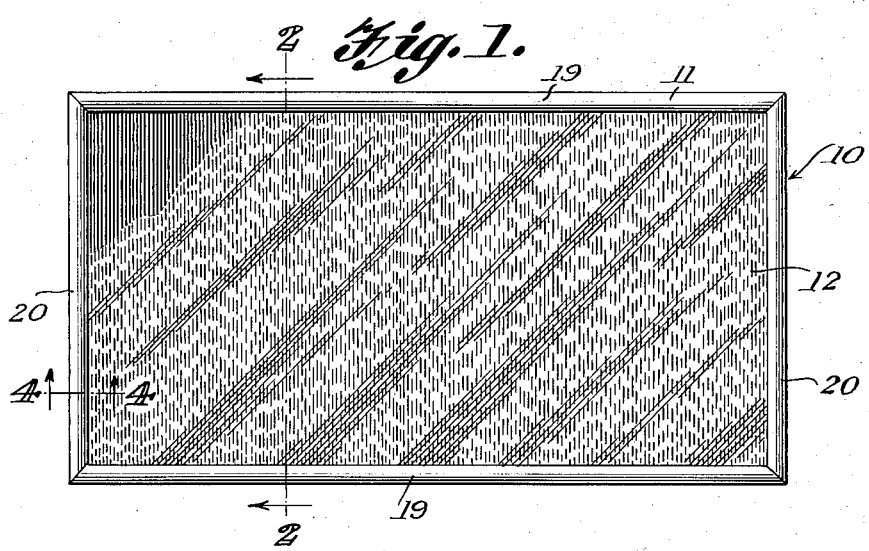
Anastasio Gutierrez, INVENTOR
BY Victor J. Evans & Co.
ATTORNEYS Patented Mar. 4, 1941

2,233,739

UNITED STATES PATENT OFFICE 2,233,739

ANTIGLARE ATTACHMENT

Anastasio Gutierrez, Mexico, D. F., Mexico

Application February 3, 1939, Serial No. 254,518
In Mexico February 11, 1938

5 Claims. (Cl. 296—97)

The present invention relates to improvements in antiglare devices adapted to be readily secured to the windshield of an automobile in the line of vision of the driver to shield the eyes of the driver from the glare of headlights of approaching automobiles.

The primary object of the invention resides in the provision of an antiglare screen including a transparent panel having means embedded therein for diffusing or refracting glaring light rays.

A further object of the invention resides in the provision of an antiglare screen embodying the use of spaced parallel members disposed in a substantially horizontal plane, said members being formed with screw threads adapted to support therein vertically disposed parallel rows of metallic wire, fibers or the like, said wires being embedded in a transparent glass panel and adapted to diffuse or refract glaring light rays.

The invention will be fully and comprehensively understood from a consideration of the following detailed description when read in connection with the accompanying drawing which forms a part of the application.

In the drawing:

Figure 1 is an elevational view of an antiglare screen embodying the features of the present invention.

Figure 2 is a vertical sectional view taken substantially on line 2—2 of Figure 1.

Figure 3 is an elevational view partly in section of the antiglare screen.

Figure 4 is a detail sectional view taken substantially on line 4—4 of Figure 1.

Figure 5 is a top plan view of the antiglare screen, and

Figure 6 is a top plan view of a modified form of the invention.

Referring to the drawing for a more detailed description thereof, the antiglare screen is generally designated by the reference numeral 10 and comprises a substantially rectangular-shaped frame 11 supporting a transparent glass panel 12. A series of parallel vertically extending wires 13 are embedded within the panel 12 and supported by the frame 11, said wires being formed of an opaque material adapted to diffuse or refract glaring light rays. As is to be understood the wires 13 are equally spaced as more clearly shown in Figure 4 of the drawing, said wires being mounted within the frame in a manner to be hereinafter described.

A pair of cylindrical-shaped members 14 are disposed in spaced parallel relation and normally lie in a horizontal plane, each of said members being formed with screw threads 15 throughout the major portion of their length. A pair of vertically disposed cylindrical-shaped members 16, one of which is more clearly shown in Figure 3 of the drawing, serve to unite the horizontal members 14 and to hold the same in spaced relation thereby completing the rectangular formation of the frame. The members 16 are attached to each end of the horizontal members 14 by solder or other desired means as indicated at 17. The wires 13 are supported in the threaded portion 15 and extend between the spaced members 14 in continuous fashion as is readily apparent from an inspection of Figure 3 of the drawing, said wires being spaced a distance equal to the size of the screw threads 15.

After formation of the frame including the members 14 and 16 supporting the wires 13 therein, said wires are then embedded in the transparent panel 12 by any method well known in the art. The frame 11 is then placed over the members 14 and 16, said frame comprising the horizontal members 19 and vertical members 20, the same being substantially C-shaped in cross section, the ends of which are adapted to be attached by soldering or other desired means. Thus there is provided a glare shield of rigid formation, including a transparent panel having vertically disposed wires embedded therein, said glare screen adapted to be attached by any desired manner, not shown, to the windshield of an automobile.

The wires 13 may be of any desired material, size and color. Fibrous material of the desired consistency may be substituted for the wires, but said fibers must be properly spaced in proportion to the screw threads formed in the horizontal disposed members 14.

In Figure 6 of the drawing there is shown a modified form of the invention embodying the use of a curved frame 21. The construction of the frame 21 is the same as that previously described including the use of the threaded members 14, vertical members 16 and wires supported between the threaded members. The wires and glass panel will, of course, assume the shape of the frame 21. An antiglare screen of this form is capable of absorbing the rays of light which tend to blind the driver of the vehicle upon the approach of other vehicles.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An antiglare screen of the character described, comprising a frame, said frame including spaced inner vertical and horizontal united members, light diffusing material carried by said horizontal members and embedded within a transparent panel and exterior members for confining said vertical and horizontal members.

2. An antiglare screen of the character described, comprising an inner substantially rectangular-shaped frame, said frame including a pair of horizontally disposed parallel members, a vertically disposed member attached to each end of said horizontal members, said horizontal members being formed with screw threads, light diffusing material supported within the threaded portion of said horizontal members and embedded within a transparent panel, and an outer frame for said screen.

3. An antiglare screen of the character described, comprising an inner frame, said frame including spaced horizontally disposed members having a screw threaded portion formed thereon, spaced vertically disposed members attached to each end of said horizontal members, an opacous wire material supported within said screw threaded portion and extending between said horizontal members and embedded within a transparent panel, and an outer frame concealing said inner frame.

4. An antiglare screen of the character described, comprising an arcuate-shaped inner frame, said frame including spaced horizontally disposed members having a screw threaded portion formed thereon, spaced vertically disposed members attached to each end of said horizontal members, an opacous wire material supported within said screw threaded portion and extending between said horizontal members and embedded within a transparent panel, and an arcuate-shaped outer frame concealing said inner frame.

5. An antiglare screen of the character described, comprising an inner frame, said frame including a pair of horizontally disposed parallel members, a vertically disposed member attached to each end of said horizontal members, means on said horizontal members for supporting a light diffusing material, the intermediate portion of said material being embedded within a transparent panel, and an outer frame for said screen.

ANASTASIO GUTIERREZ.